United States Patent
Darabi et al.

(10) Patent No.: US 7,447,275 B2
(45) Date of Patent: *Nov. 4, 2008

(54) IF FSK RECEIVER

(75) Inventors: Hooman Darabi, Los Angeles, CA (US); Shahla Khorram, Los Angeles, CA (US); Maryam Rofougaran, Marina del Rey, CA (US)

(73) Assignee: Broadcom Corporation, Irvine, CA (US)

( * ) Notice: Subject to any disclaimer, the term of this patent is extended or adjusted under 35 U.S.C. 154(b) by 101 days.

This patent is subject to a terminal disclaimer.

(21) Appl. No.: 11/184,361

(22) Filed: Jul. 18, 2005

(65) Prior Publication Data

US 2006/0002491 A1    Jan. 5, 2006

Related U.S. Application Data

(63) Continuation of application No. 09/960,536, filed on Sep. 21, 2001, now Pat. No. 6,968,019.

(60) Provisional application No. 60/253,268, filed on Nov. 27, 2000.

(51) Int. Cl.
  *H03K 9/00* (2006.01)
  *H04L 27/00* (2006.01)
(52) U.S. Cl. ............... 375/316; 375/324; 375/330
(58) Field of Classification Search ............... 375/330, 375/329, 316, 324; 329/304
See application file for complete search history.

(56) References Cited

U.S. PATENT DOCUMENTS

| 3,947,769 | A | | 3/1976 | Rousos et al. |
|---|---|---|---|---|
| 4,254,503 | A | | 3/1981 | Vance |
| 4,339,829 | A | * | 7/1982 | Dimon ............... 455/340 |
| 5,414,730 | A | | 5/1995 | Lundquist et al. |
| 5,502,746 | A | | 3/1996 | Ozguc |
| 5,691,656 | A | * | 11/1997 | Sandusky ............ 327/7 |
| 5,694,079 | A | | 12/1997 | Allpress et al. |
| 5,832,043 | A | * | 11/1998 | Eory ............... 375/344 |
| 5,949,830 | A | * | 9/1999 | Nakanishi ............ 375/334 |
| 6,091,963 | A | * | 7/2000 | Mannerstr.ang.le et al. ...... 455/552.1 |

(Continued)

FOREIGN PATENT DOCUMENTS

EP    0814 462    A2    12/1997

(Continued)

OTHER PUBLICATIONS

Drude, Von Stefan, "Zwei ICs für einen Pager," Funkschau, Franzis-Verlag K.G.; Dec. 15, 1989; pp. 69 73-76; No. 26- ISSN 0016-2841; XP000080168; Munchen DE.

(Continued)

*Primary Examiner*—Curtis B Odom

(57) ABSTRACT

In one embodiment, the present invention is a low-power, and high performance receiver including an IF demodulator for high data rate, frequency modulated systems, such as Bluetooth. The IF demodulator is implemented in analog domain for simplicity and lower power consumption and operates at an IF frequency. An IF demodulator comprises: a first IF differentiator for differentiating an I signal; a second IF differentiator for differentiating a Q signal; a cross-coupled multiplier for multiplying the differentiated I signal with the Q signal and multiplying the differentiated Q signal with the I signal to extract frequency information from the I signal and the Q signal; and a slicer for converting the frequency information to digital data.

13 Claims, 5 Drawing Sheets

U.S. PATENT DOCUMENTS

| | | | | |
|---|---|---|---|---|
| 6,127,884 A | * | 10/2000 | Rishi | 329/304 |
| 6,377,315 B1 | * | 4/2002 | Carr et al. | 348/726 |
| 6,385,442 B1 | * | 5/2002 | Vu et al. | 455/318 |
| 6,417,737 B1 | * | 7/2002 | Moloudi et al. | 330/301 |
| 6,738,601 B1 | | 5/2004 | Rofougaran et al. | |
| 2002/0150147 A1 | * | 10/2002 | Liang | 375/133 |

FOREIGN PATENT DOCUMENTS

WO    WO 97/32422    9/1997

OTHER PUBLICATIONS

Seifart, "Analoge Schaltungen,", Verlag Technik GMBH; 1994; pp. 351, 352, 372, 373, 377, and 378; XP002187644; Berlin.

* cited by examiner

IF FSK RECEIVER

CROSS-REFERENCE TO RELATED APPLICATIONS

This patent application is a continuation of U.S. patent application Ser. No. 09/960,536 now U.S. Pat. No. 6,968,019, filed Sep. 21, 2001, which claims the benefit of the filing date of U.S. Provisional Patent Application Ser. No. 60/253,268, filed Nov. 27, 2000 and entitled "IF FSK DEMODULATOR"; the entire contents of which are hereby expressly incorporated by reference.

FIELD OF THE INVENTION

The present invention relates to communication systems. More specifically, the invention relates to signal demodulation.

BACKGROUND OF THE INVENTION

Some radio transmission standards such as, the Bluetooth standard, specify a 2.4 GHz frequency-hopped, spread-spectrum system using a Gaussian-FSK (GFSK) modulation scheme with a data rate of 1 Mb/sec. The frequency offsets are ±160 kHz, corresponding to a nominal modulation index of 0.32 and the data bandwidth is about 1 MHz. Consequently, an exemplary Bluetooth receiver has a 2 MHz intermediate frequency (IF), causing the image signal to be within the 80 MHz ISM band. The image reject requirement is therefore relaxed, and may be achieved by an on-chip complex-domain bandpass filter (BPF). Once the desired channel is selected, a limiter amplifies it to a well-defined level, and the received signal strength is indicated.

A commonly used type of pulse-code modulation is FSK, in which the carrier frequency changes abruptly by an amount $\Delta f$ as the modulating signal changes from the zero level to the one level, or vice versa. A FSK demodulation typically uses a differentiator followed by I and Q multipliers. However, if implemented at base-band, the desired signal at 2 MHz is down-converted to zero IF. This approach needs to use four additional mixers for single side-band, quadrature downconversion, and a 2 MHz clock generator. This increases the receiver power dissipation, and leads to a larger silicon area. Additionally, the base-band demodulator is more susceptible to DC offset and low frequency noise and interference.

Typically, an analog differentiator followed by an envelope detector can be used to detect an FM modulated signal. This is simple and low-power, however, its performance is limited due to the inaccuracy of the components once realized in an IC. In contrast, an FSK demodulator may be implemented digitally, which is more robust, yet it consumes more power, and is more complex.

Moreover, a direct-conversion receiver also has few disadvantages. For example, since the GFSK spectrum has energy at zero IF, DC offset and 1/f noise may degrade the receiver performance. Also, a limiter at base-band is generally not suitable for a GFSK signal down-converted to zero IF, since the harmonics of the limited signal fall inside the desired band, degrading the receiver BER. This problem may be evaded if the limiter is substituted by an automatic gain controller (AGC). However, an AGC is complicated and consumes more power.

Therefore, there is a need for a radio transceiver having the characteristics of low size, cost and power. Furthermore, there is a need for a receiver including an analog demodulator and a differentiator that operate at an IF frequency rather than a baseband frequency.

SUMMARY OF THE INVENTION

In one embodiment, the present invention describes a low-power, and high performance receiver including an IF demodulator for high data rate, frequency modulated systems, such as Bluetooth. The IF demodulator is implemented in analog domain for simplicity and lower power consumption and operates at an IF frequency.

In one aspect, an IF demodulator comprising: a first IF differentiator for differentiating an I signal; a second IF differentiator for differentiating a Q signal; a cross-coupled multiplier for multiplying the differentiated I signal with the Q signal and multiplying the differentiated Q signal with the I signal to extract frequency information from the I signal and the Q signal; and a slicer for converting the frequency information to digital data is disclosed in the present invention.

In another aspect, a method for demodulating an IF FSK signal comprising the steps of: receiving an IF I signal input and an IF Q signal input; differentiating the I signal at the frequency of the I signal by a first IF differentiator; differentiating the Q signal at the frequency of the Q signal by a second IF differentiator; multiplying the differentiated I signal with the Q signal and multiplying the differentiated Q signal with the I signal for extracting frequency information from the I signal and the Q signal; and converting the frequency information to digital data is described in the present invention.

BRIEF DESCRIPTION OF THE DRAWINGS

The objects, advantages and features of this invention will become more apparent from a consideration of the following detailed description and the drawings, in which.

DETAILED DESCRIPTION

To lower the size, cost and power of portable devices with wireless connectivity, all the components are integrated into one single chip. Full integration of a radio transceiver system can reduce cost and power consumption, which can be accomplished by moving the bulky and expensive external image reject, channel select filters and baluns onto a single RF chip and eliminating the number of off-chip passive elements such as capacitors, inductors, and resistors by moving them onto the chip, and integrating all the components including RF, analog, baseband and digital signal processing (DSP) onto the chip.

Figure 1:
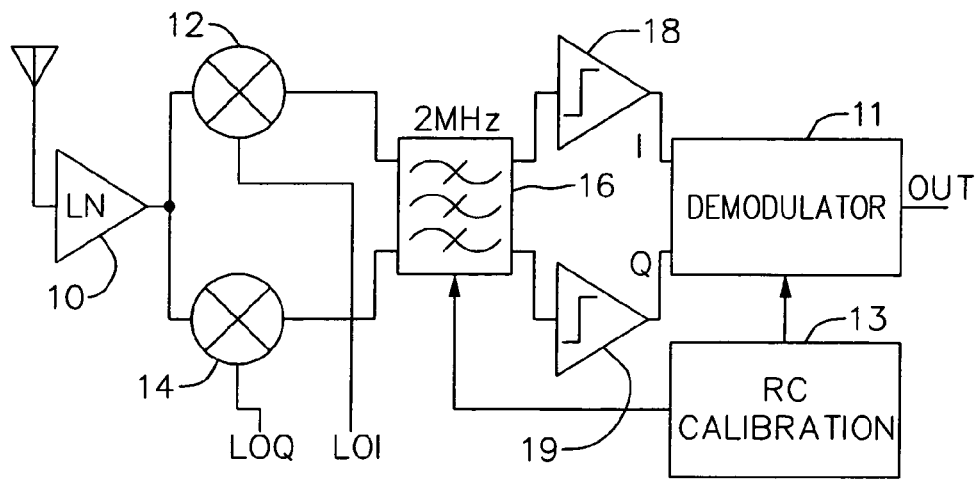
FIG. 1 is an exemplary low-IF receiver architecture, according to one embodiment of the present invention.

The present invention discloses a receiver including an FSK demodulator for use in various applications including Bluetooth. FIG. 1 shows an exemplary low-IF receiver architecture in accordance with an embodiment of the present invention. Low noise amplifier (LNA) 10 amplifies the input signal at 2.4 GHz. Down converters 12 and 14 convert the amplified input signal to a lower frequency signal, for example, a 2 MHz signal by mixing the input signal with respective lower frequency signals LOI and LOQ that are generated locally. A channel selector filter 16 selects a desired channel of frequency. e.g., a 2 MHz channel. The channel selector filter is essentially a bandpass filter (BPF) that passes through the selected frequency and rejects the other frequencies.

Amplifiers 18 and 19 further amplify the I and Q signals respectively. In one implementation, limiters which are a special form of amplifiers are used because they are simpler, low power, and easier to implement. Demodulator 11 exploits the amplified 2 MHz signal to detect the amplitude of the differentiated signal. Since the input signal to the demodulator 11 is at 2 MHz, the demodulator is designed in such a unique way to work at 2 MHz, without having to convert the 2 MHz signal to the baseband signal. An RC calibration 13 circuit monitors process variation and mismatch variations and tunes the receiver to avoid spurious signals. In one embodiment, the RC calibration 13 calibrates all the active resistors and capacitors to some reference frequency that has a well defined behavior. Self-calibration may be used in the receiver for optimal performance and programmed through software.

Figure 2:
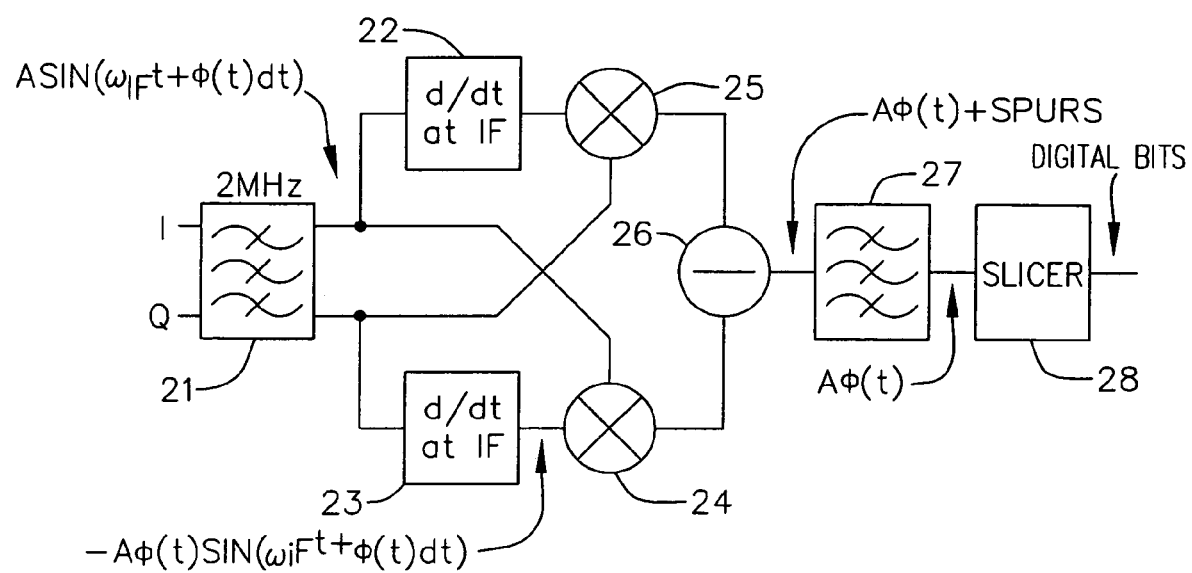
FIG. 2 is an exemplary block diagram of an IF demodulator, according to one embodiment of the present invention.

FIG. 2 is an exemplary implementation of the demodulator 11 in FIG. 1. BPF 21 is used to shape the limited input signal waveform to a sinusoidal shaped waveform. This BPF rejects the harmonics of the desired channel. Moreover, it attenuates the remaining adjacent interference due to the incomplete channel selection at the BPF. Differentiators 22 and 23 take the I and Q signal and differentiate them to take the frequency information ($\phi(t)$) out of the sinusoidal input signals I and Q. However, this frequency information may include some undesired signals and noise. The cross-couple multipliers 24 and 25 multiply I and Q signals with differentiated Q and I respectively and subtractor 26 subtracts the multiplied signals so that the sin and cos cancel out each other to produce a non-sinusoidal signal A $\phi(t)$ plus spurs at the output of the subtractor 26.

Figure 3:
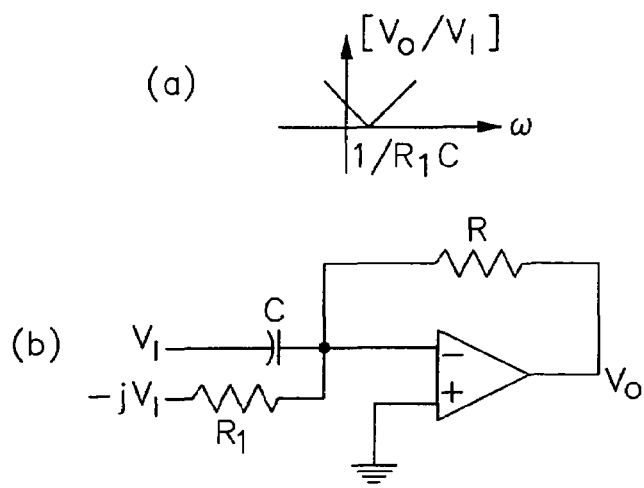
FIG. 3 is an exemplary block diagram of an IF differentiator, according to one embodiment of the present invention.

As quadrature signals are available at the demodulator 11 input, the differentiators 22 and 23 shift their center frequency to some desired IF, e.g., 2 MHz. As illustrated in FIG. 3, a resistor (R1) connected to the Q (and I) input (jv is the input signal from Q channel), translates the base-band frequency response to an IF set by 1/R1C. The frequency response of the IF differentiator is expressed in the following equation:

$$\frac{V_o}{V_i}(jw) = -jRC\left(w - \frac{1}{R_1C}\right) \quad (1)$$

Thus, the center frequency of the IF differentiator moves to 1/R1C. This center frequency may be adjusted by selecting appropriate values for R1 and C to any IF frequency. In one implementation the values for R1 and C are selected to obtain an IF frequency of 2 MHz.

Referring back to FIG. 2, a lowpass filter (LPF) 27 cleans the demodulated spectrum whose bandwidth is about ±550 kHz to eliminate the spurs. The LPF 27 is sharp enough to reject the undesired signals produced due to the non-ideal mixing action in the multipliers or mismatches, yet wide enough not to filter the desired signal, or cause settling issues. Following the LPF 27, a slicer 28 is used to convert the analog detected output to digital bits.

Figure 4:
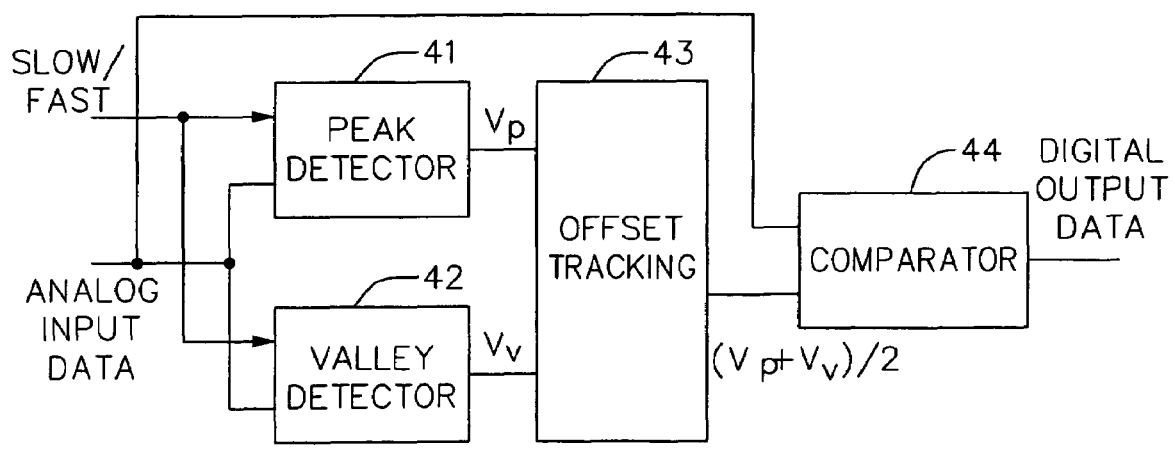
FIG. 4 is an exemplary block diagram of a slicer, according to one embodiment of the present invention.

FIG. 4 is an exemplary block diagram for the slicer 28 of FIG. 2. As shown in FIG. 4, the slicer includes a peak detector 41, a valley detector 42, an offset tracking circuit 43 at the output of the peak and valley detector, and a comparator 44 at the output of the offset tracking. The offset tracking circuit 43 adjusts the DC level of the analog eye by taking the average of the peak and valley detector outputs. Digital eye is produced by comparing this DC offset to the analog eye.

A $\phi(t)$, the analog signal at the input of the slicer 28 in FIG. 2, is applied to the inputs of the peak detector 41 and the valley detector 42 in FIG. 4. The peak detector 41 detects the peak of the analog input signal $V_p$ and the valley detector 42 detect the valleys (minimums) of the analog input signal $V_v$. The offset tracking circuit 43 takes the average of $V_p$ and $V_v$ (($V_p+V_v$)/2) to produce a DC average of the peak and valley. This DC average signal is compared with the original analog signal by comparator 44 to produce the desired digital output. At the output of comparator, a high signal is produced if the analog input signal is higher than its DC average value, and a low signal is produced if the analog input signal is lower than its DC average value. The Slow/Fast signal depicted in FIG. 4 indicates whther the slicer must go to fast attack mode or slow decay mode described below.

Any frequency error caused by the crystal inaccuracy would result in a DC component at demodulator 11 analog output. However, since the slicer detects the DC level of the analog eye, both inputs of the comparator are shifted because of this DC offset, and the digital eye remains unaffected.

To achieve a robust performance and to minimize the sensitivity to process variation, in one embodiment, the individual blocks are implemented using local feedback. Thus, the demodulator characteristics, such as analog eye amplitude or its DC level are set merely by the ratio of the resistors or devices which are accurately defined in an IC.

Figure 5:
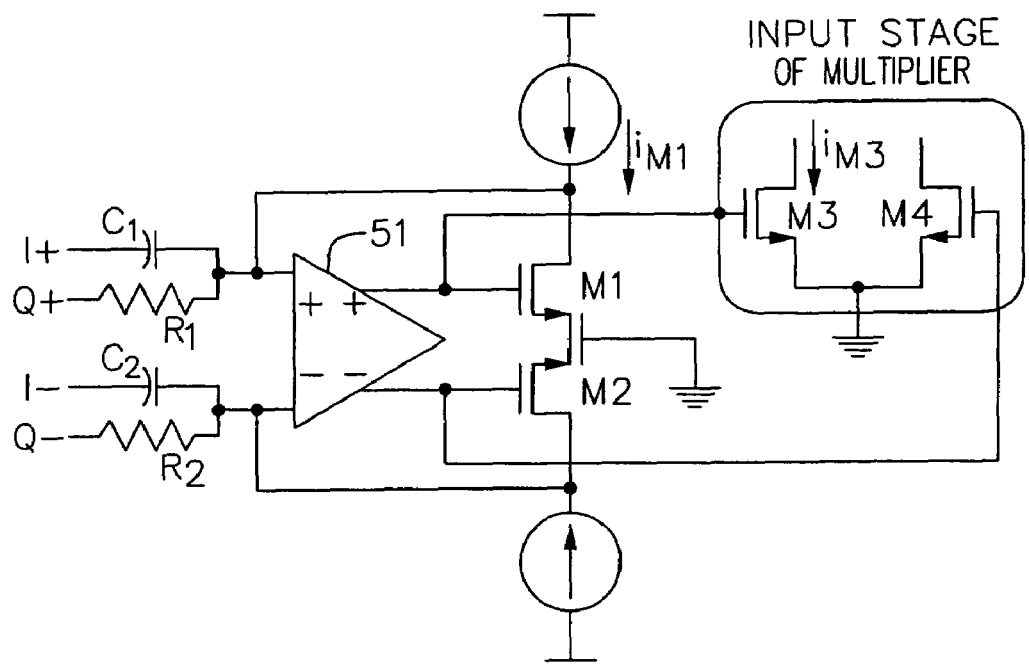
FIG. 5 is an exemplary simplified circuit diagram of an IF differentiator, according to one embodiment of the present invention.

FIG. 5 is an exemplary circuit implementation of a differentiator (blocks 22 or 23 in FIG. 2), according to one embodiment of the present invention. The IF differentiator uses a single-stage operational amplifier (op-amp) followed by a common-source stage in a unity gain feedback, as shown in FIG. 5. The differential inputs pairs I+, I−, Q+, and Q− are connected to the differential op-amp 51 via R1, c1, R2, and C2 respectively, where R1=R2 and C1=C2. There is a feedback loop from each input of the op-amp 51 to its respective output through transistors M1 and M2, respectively. This feedback loop preserves the same AC voltage at the gates of transistors M1 and M3.

Transistors M3 and M4 form the input stage of a multiplier (blocks 24 or 25 in FIG. 2). The values for the four transistors M1, M2, M3, and M4 are the same so that the same amount of current, $I_{M3}$ flows through all of them. Thus, if the signal at the differentiator input is $V_i$, the AC current flowing through transistors M1/M2 will be equal to:

$$i_{M1} = jC\left(w - \frac{1}{R_1C}\right)V_i \quad (2)$$

Figure 6:
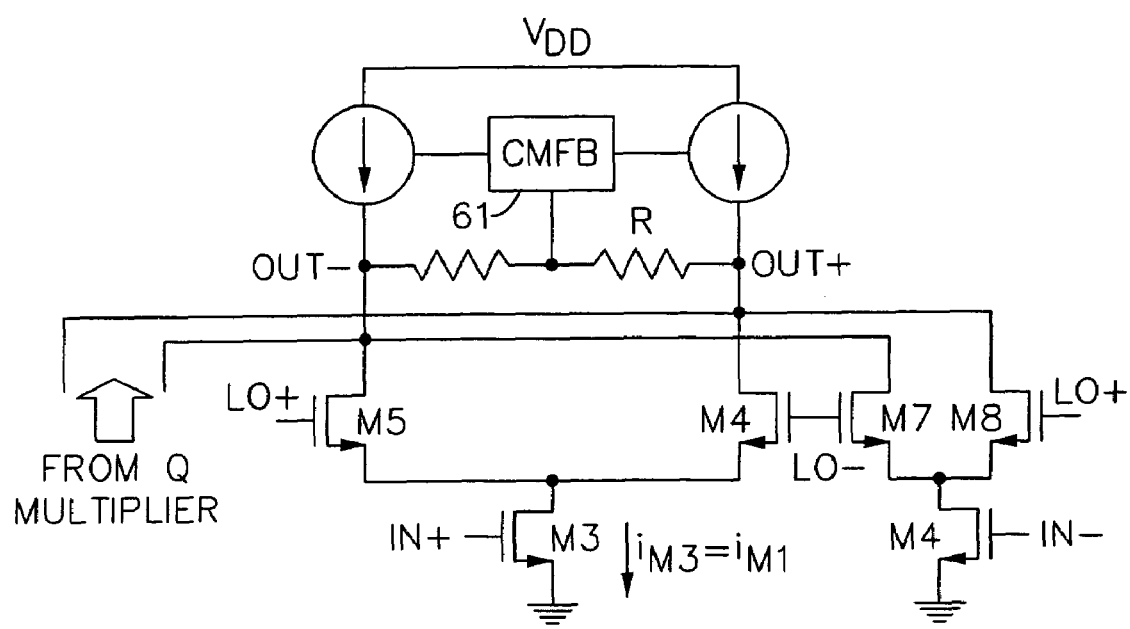
FIG. 6 is an exemplary simplified circuit diagram of a multiplier, according to one embodiment of the present invention.

This current is mirrored into the input devices (M3/M4) of the multipliers which are implemented as Gilbert-type mixers, shown in FIG. 6.

FIG. 6 is an exemplary circuit implementation for multiplier 25 (I multiplier) of FIG. 2. The Q multiplier 24 has a similar circuit implementation. The input stage of the multiplier (M3/M4) takes the differential input IN+ and IN− that is the output of the BPF 21 in FIG. 2. Transistors M5/M6 and M7/M8 form the differential pair Gilbert-type mixers that take the differential input LO+ and LO− to multiply LO signal by IN signal. As shown, the outputs of the I multiplier are connected to the outputs of the Q multiplier (not shown) to simply form the subtractor block 26 of FIG. 2. The common mode feedback (CMFB) 61 is used to adjust the DC output levels.

Assuming an ideal switching loss of 2/π and a load resistance of R in the multipliers, the signal at the multipliers output will be:

$$V_0 = \left(A \frac{2}{\pi} RC\right) \cdot \phi(t) \quad (3)$$

Where A is the amplitude of the signal at the differentiator input (Vi), and φ(t) is its frequency information. In equation 2, 1/R1C is set to 2 MHz.

Any mismatch between I and Q paths causes an incomplete addition of $Cos^2$ and $Sin^2$ components at the multipliers output, producing an undesired signal at $2\omega_{IF}$. In addition, a DC offset at the multiplier LO or input port creates an undesired signal at ωIF at the multiplier output. However, for 2 MHz IF, all these spurs are located at least at 2 MHz or above, and the LPF 27 whose bandwidth is about 550 kHZ rejects them.

Since the gain and center frequency of the differentiator, as well as the bandwidth and center frequency of the filters are determined by the RCs, an on-chip calibration circuit is designed to adjust the RC time constants in the presence of temperature and process variation, as shown in FIG. 1. In one embodiment, all the capacitors are implemented as digitally-controlled binary array of capacitors. The RC calibration circuit tunes 1/RC to a reference crystal frequency.

In this embodiment, both the post-limiter BPF and the LPF after the multipliers are realized as active RC configuration. Therefore, their passband gain is accurately set by ratio of the resistors. Moreover, the input signal amplitude (A in equation 3) is set by the limiter, which is constant over process or temperature variation, and is independent of the received signal power. As a result, the gain of demodulator only depends on the differentiator gain, that is, RC, which is precisely controlled by the on-chip calibration circuit.

Figure 7:
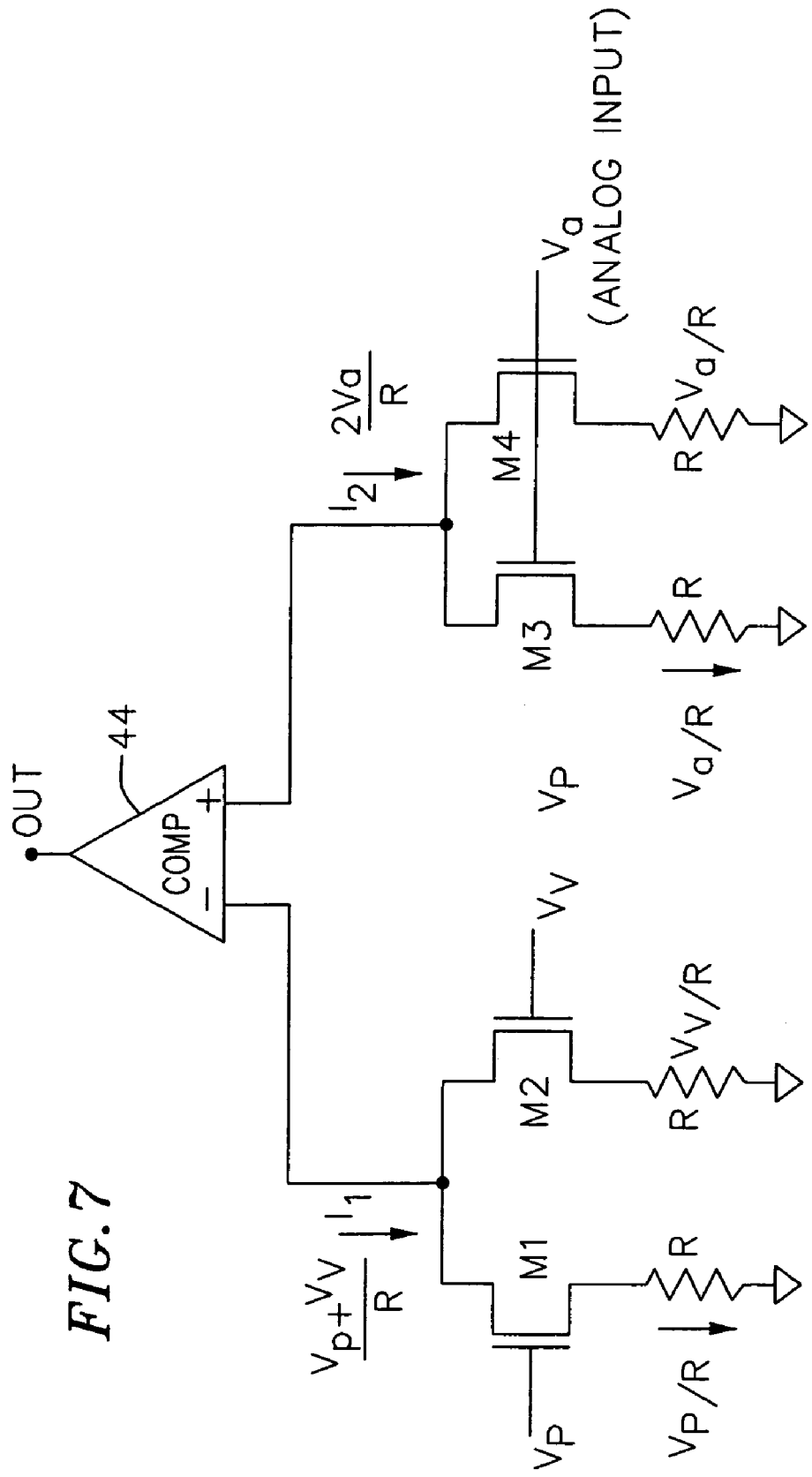
FIG. 7 is an exemplary simplified circuit diagram of an offset tracker, according to one embodiment of the present invention.

FIG. 7 is an exemplary circuit implementation for the offset tracker 43 of FIG. 4. The drains of the transistors M1 & M2 is connected and their sources are connected to two equal value resistors R. Current I1 is proportional to $V_p+V_v/R$, therfore proportional to the average of $V_p$ and $V_v$. Transistors M3 and M4 have a similar arrangement to M1 and M2 arrangement, except that heir gates are connected together and is driven by $V_a$, the analog input. As a result, I2 current is proportional to $2V_a/R$.

Figure 8:
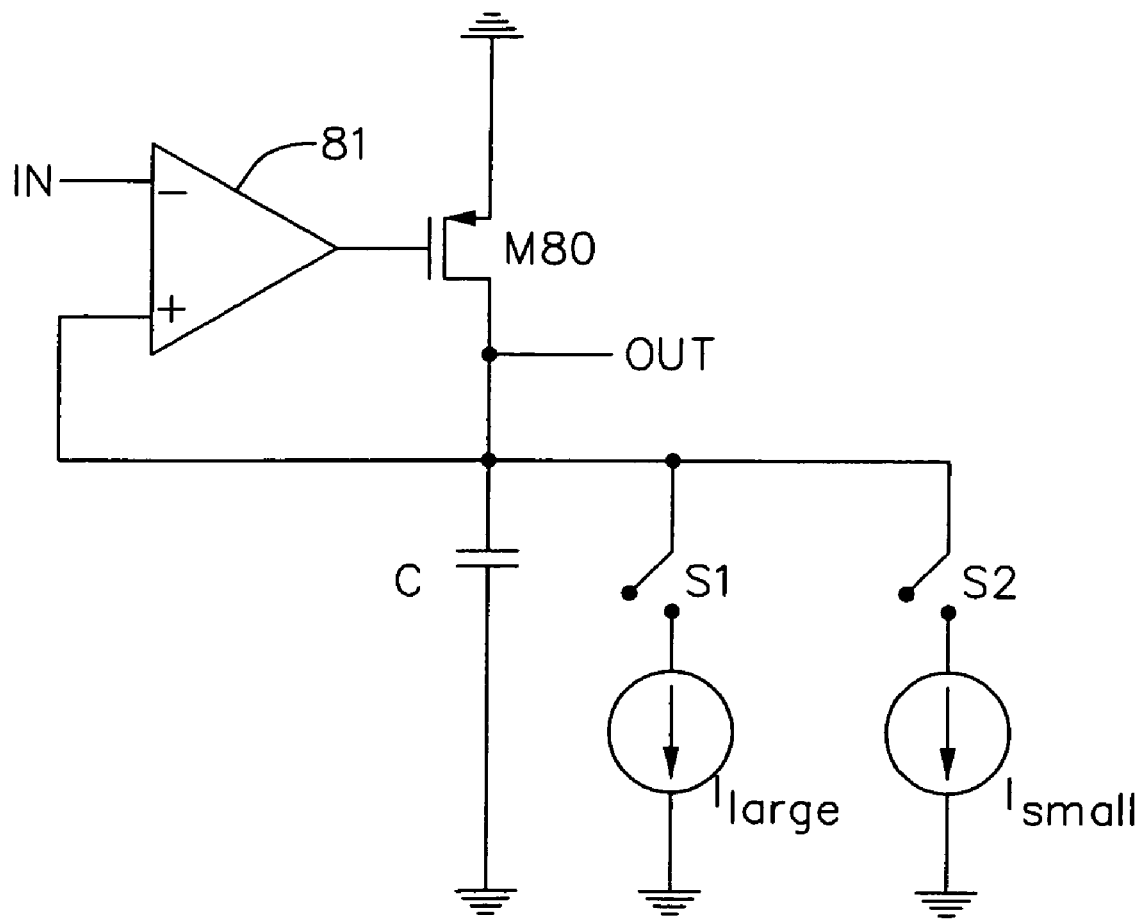
FIG. 8 is an exemplary simplified circuit diagram of a peak/valley detector, according to one embodiment of the present invention.

FIG. 8 is an exemplary simplified circuit diagram for a peak (or valley) detector (blocks 41 and 42 in FIG. 4). The peak/valley detectors take the peak (or valley) of the input signal as an input and charge the capacitor C to a peak (or a valley) using the OpAmp 81 and the PMOS transistor M80. However, since the leakage current of the capacitor C is small, the capacitor C takes a long time to charge or discharge in response to changes in peaks or valleys. OpAmp 81 is a differential pair OpAmp with single ended output. When the signal at the input of the OpAmp increases, because of the OpAmp's high gain, its output goes to zero which in turn, turns transistor M80 on. That pulls the output voltage high to adjust the peak value.

To ameliorate the slow nature of the peak/valley detectors, two time constants, namely fast attack and slow decay, are assigned to the detectors, as shown in FIG. 8. At the receiver start-up, the detectors are switched to fast attack mode by fast switch S1 that is connected to a large current sink, regulating their outputs quickly to the peak and valley of the received analog eye. Once this initial adjustment is accomplished, the detectors switch to slow decay mode by S2 that is connected to a small current sink, where the peak/valley detector capacitor C at the OUT node is slowly discharged by the leakage current $I_{small}$. These time constants are adaptively set by detecting the received eye amplitude, and based on the receiver start-up signal through controlling the timing of the two switches S1 and S2.

In one embodiment, an FSK demodulator for use in various applications including Bluetooth is implemented in a 0.35 μm CMOS process. The entire exemplary demodulator, integrated as a part of a low-IF receiver with 2 MHz intermediate frequency, consumes 3 mA from 2.7 V supply. The required signal-to-noise ratio (SNR) for 0.1% bit error rate (BER) is about 18 dB in this implementation.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the invention as defined in the claims.

What is claimed is:

1. An IF receiver comprising:
    an I-mixer configured to down convert a received analog input signal to a first lower frequency signal;
    a Q-mixer configured to down convert the input signal to a second lower frequency signal;
    a channel selector filter coupled to the I-mixer and the Q-mixer, the channel selector filter being configured to generate an I signal and a Q signal; and
    an IF demodulator configured to receive the I signal and the Q signal without down conversion to a baseband signal and extract information from the input signal responsive to the I signal and Q signal, the IF demodulator comprising:
        a first IF differentiator configured to differentiate the I signal, the first IF differentiator including a first resistive-capacitive (RC) circuit configured to establish a center frequency of the I signal; and
        a second IF differentiator configured to differentiate the Q signal, the second IF differentiator including a second RC circuit configured to establish a center frequency of the Q signal,
    wherein each of the first and second IF differentiators comprises an operational amplifier configured to receive an input signal and generate an output signal at an output node, and
    wherein each of the first and second RC circuits comprises:
        a first resistor coupled in parallel between the output node and a negative input of the respective operational amplifier;
        a capacitor coupled between the negative input and the input signal; and
        a second resistor coupled between the negative input and the input signal.

2. The IF receiver of claim 1, further comprising an amplifier configured to receive the analog input signal, amplify the received analog input signal and output the amplified analog input signal to the I-mixer and the Q-mixer.

3. The IF receiver of claim 1, wherein the IF demodulator further comprises:
a cross-coupled multiplier configured to multiply the differentiated I signal with the Q signal and multiply the differentiated Q signal with the I signal to extract frequency information from the I signal and the Q signal; and
a slicer configured to convert the frequency information to digital data.

4. The IF receiver of claim 1, wherein frequency response for each of the first and second IF differentiators is defined by:

$$\frac{V_o}{V_i}(jw) = -jRC\left(w - \frac{1}{R_1 C}\right) \quad (1)$$

where $V_o$ is the output signal, Vi is the input signal, R, $R_1$, and C are the values for the first resistor, the second resistor, and the capacitor respectively.

5. The IF receiver of claim 3, wherein the slicer comprises:
a peak detector configured to receive an analog data input signal and a slow/fast signal for generating a peak signal responsive to peaks of the analog input signal for generating the peak signal;
a valley detector configured to receive an analog data input signal and a slow/fast signal for generating a valley signal responsive to valleys of the analog data input signal for generating the valley signal;
an offset tracker coupled to an output terminal of the peak detector and an output terminal of the valley detector, the offset tracker being configured to take the average of the peak signal and the valley signal; and
a comparator coupled to an output terminal of the offset tracker and an analog data input terminal, the comparator being configured to generate a high signal if a signal present at the analog data input terminal is higher than its average value, and generate a low signal if the signal at the analog data input terminal is lower than its average value.

6. The IF receiver of claim 5, wherein the peak detector comprises:
a capacitor driven by a current source;
a first discharge current source configured to discharge the capacitor, the first current source being selectable by a first switch; and
a second discharge current source configured to discharge the capacitor, the second current source being selectable by a second switch, wherein the first switch and the second switch are adaptively activated to selectively discharge the capacitor either in a fast discharge mode by the first discharge current or a slow discharge mode by the second discharge current.

7. The IF receiver of claim 3, wherein the IF demodulator further comprises a band pass filter configured to shape the I signal and the Q signal.

8. The IF receiver of claim 1, further comprising:
a first limiter configured to amplify the I signal; and
a second limiter configured to amplify the Q signal.

9. A method for demodulating an IF FSK signal comprising:
receiving a modulated signal;
generating an IF I signal and an IF Q signal from the received modulated signal without converting the received modulated signal to a baseband signal, wherein generating the IF I signal and the IF Q signal comprises:
amplifying the I signal and the Q signal;
establishing a center frequency of the I signal using a first resistive-capacitive (RC) circuit included in a first IF differentiator;
differentiating the I signal at the frequency of the I signal using the first IF differentiator;
establishing a center frequency of the Q signal using a second resistive-capacitive (RC) circuit included in a second IF differentiator; and
differentiating the Q signal at the frequency of the Q signal using the second IF differentiator; and
extracting frequency information from the I signal and the Q signal, wherein extracting the frequency information comprises:
multiplying the differentiated I signal with the Q signal; and
multiplying the differentiated Q signal with the I signal.

10. The method of claim 9, further comprising converting the frequency information to digital data.

11. The method of claim 9, wherein the step of differentiating the I signal comprises applying a transfer function of $$\frac{V_o}{V_i}(jw) = -jRC\left(w - \frac{1}{R_1 C}\right) \quad (1)$$

to the I signal, where $V_o$ is an output signal, $V_i$ is an input signal, R, $R_1$, and C are the values for two resistors and a capacitor, respectively.

12. The method of claim 9, wherein the step of differentiating the Q signal comprises applying a transfer function of $$\frac{V_o}{V_i}(jw) = -jRC\left(w - \frac{1}{R_1 C}\right) \quad (1)$$

to the Q signal, where $V_o$ is an output signal, $V_i$ is an input signal, R, $R_1$, and C are the values for two resistors and a capacitor, respectively.

13. The method of claim 10, wherein the step of converting the frequency information to digital data comprises:
receiving an analog data input signal and a slow/fast signal for generating a peak signal responsive to peak of the analog data input signal for generating the peak signal;
receiving an analog data input signal and a slow/fast signal for generating a valley signal responsive to valleys of the analog data input signal for generating the valley signal;
taking the average of the peak signal and the valley signal; and
generating a high signal if the analog data input is higher than its average value, and generating a low signal if the analog data input is lower then its average value.

* * * * *